(12) United States Patent
Sadler et al.

(10) Patent No.: US 7,729,957 B2
(45) Date of Patent: Jun. 1, 2010

(54) ITEM ATTRIBUTE PREVERIFICATION

(75) Inventors: John J. Sadler, Dunkirk, MD (US); Larry Goodman, Waldorf, MD (US); Robert Galaher, Annapolis, MD (US); Dana Nacke, Germantown, MD (US); William Gallagher, Gambrois, MD (US); Paul Bakshi, Fairfax Station, VA (US); Scott Lamoreux, Raleigh, NC (US); Hughes Pierce, Falls Church, VA (US); Robert Dvonch, Manassas, VA (US); Dana Foster, Nobleville, IN (US); EvaMarie Lizzol, Ashburn, VA (US); Lynn Hunsicker, Lorton, VA (US); Jim Hess, Pembroke, FL (US); John Sexton, Reston, VA (US); Himesh Patel, Centreville, VA (US); Robert Kooken, Boyds, MD (US); John Blalock, Fort Washington, MD (US); Diane Smith, Upper Marlboro, MD (US); Albert J. Johnson, Fairfax, VA (US)

(73) Assignee: United States Postal Service, Washington, DC (US)

( * ) Notice: Subject to any disclaimer, the term of this patent is extended or adjusted under 35 U.S.C. 154(b) by 1702 days.

(21) Appl. No.: 10/333,841

(22) PCT Filed: Jul. 24, 2001

(86) PCT No.: PCT/US01/23177

§ 371 (c)(1),
(2), (4) Date: Jun. 24, 2003

(87) PCT Pub. No.: WO02/08961

PCT Pub. Date: Jan. 31, 2002

(65) Prior Publication Data

US 2003/0236757 A1 Dec. 25, 2003

Related U.S. Application Data

(60) Provisional application No. 60/220,602, filed on Jul. 25, 2000.

(51) Int. Cl.
*G06Q 10/00* (2006.01)
(52) U.S. Cl. .......................... 705/28; 705/410; 705/400
(58) Field of Classification Search .................. 705/28, 705/410, 10
See application file for complete search history.

(56) References Cited

U.S. PATENT DOCUMENTS 4,135,662 A 1/1979 Dlugos (Continued)

FOREIGN PATENT DOCUMENTS

EP 0 516 898 A1 12/1992

(Continued)

OTHER PUBLICATIONS

"Export management firms provide alternatives", Anonymous. Carin's Chicago Business. Chicago: Dec. 12, 1983. vol. 6, Issue 50; p. 17 [retrieved from ProQuest Dec. 19, 2005] (1 page).

(Continued)

*Primary Examiner*—Vanel Frenel
(74) *Attorney, Agent, or Firm*—Finnegan, Henderson, Farabow, Garrett and Dunner LLP

(57) ABSTRACT

A method and system for providing attribute verification (330) consistent with the invention includes obtaining the attributes (320) of the item prior to placing the item in a delivery system (350), verifying correctness of the attributes (320), and transmitting an indication of the correctness of the attributes to a delivery system operator over a communications system (340).

37 Claims, 9 Drawing Sheets

U.S. PATENT DOCUMENTS

| | | | |
|---|---|---|---|
| 4,309,569 A | 1/1982 | Merkle | |
| 4,574,352 A * | 3/1986 | Coppola et al. | 705/407 |
| 4,725,718 A * | 2/1988 | Sansone et al. | 235/495 |
| 4,727,368 A | 2/1988 | Larson et al. | |
| 4,816,824 A | 3/1989 | Katz et al. | |
| 5,043,908 A | 8/1991 | Manduley et al. | |
| 5,136,646 A | 8/1992 | Haber et al. | |
| 5,136,647 A | 8/1992 | Haber et al. | |
| 5,223,829 A | 6/1993 | Watabe | |
| 5,373,561 A | 12/1994 | Haber et al. | |
| 5,404,231 A | 4/1995 | Bloomfield | |
| RE34,954 E | 5/1995 | Haber et al. | |
| 5,481,464 A * | 1/1996 | Ramsden | 705/407 |
| 5,631,827 A | 5/1997 | Nicholls et al. | |
| 5,638,446 A | 6/1997 | Rubin | |
| 5,701,770 A | 12/1997 | Cook et al. | |
| 5,703,951 A * | 12/1997 | Dolphin | 705/51 |
| 5,710,887 A | 1/1998 | Chelliah et al. | |
| 5,729,594 A | 3/1998 | Klingman | |
| 5,774,053 A | 6/1998 | Porter | |
| 5,781,629 A | 7/1998 | Haber et al. | |
| 5,857,188 A | 1/1999 | Douglas | |
| 5,870,549 A | 2/1999 | Bobo | |
| 5,878,233 A | 3/1999 | Schloss | |
| 5,903,878 A * | 5/1999 | Talati et al. | 705/26 |
| 5,917,411 A | 6/1999 | Baggarly | |
| 5,917,925 A | 6/1999 | Moore | |
| 5,943,656 A | 8/1999 | Crooks et al. | |
| 5,971,587 A | 10/1999 | Kato et al. | |
| 5,979,750 A | 11/1999 | Kindell | |
| 6,006,200 A | 12/1999 | Boies et al. | |
| 6,028,517 A | 2/2000 | Sansone et al. | |
| 6,035,402 A | 3/2000 | Vaeth et al. | |
| 6,047,264 A | 4/2000 | Fisher et al. | |
| 6,064,995 A | 5/2000 | Sansone et al. | |
| 6,070,798 A | 6/2000 | Nethery | |
| 6,138,910 A | 10/2000 | Madruga | |
| 6,152,369 A | 11/2000 | Wilz et al. | |
| 6,219,669 B1 | 4/2001 | Haff et al. | |
| 6,233,565 B1 | 5/2001 | Lewis et al. | |
| 6,243,620 B1 * | 6/2001 | Robinson et al. | 700/223 |
| 6,246,925 B1 | 6/2001 | Robinson et al. | |
| 6,259,964 B1 | 7/2001 | Robinson | |
| 6,285,991 B1 | 9/2001 | Powar | |
| 6,289,323 B1 | 9/2001 | Gordon et al. | |
| 6,323,782 B1 | 11/2001 | Stephens et al. | |
| 6,347,737 B1 | 2/2002 | Madruga | |
| 6,442,571 B1 | 8/2002 | Haff et al. | |
| 6,446,045 B1 | 9/2002 | Stone et al. | |
| 6,463,354 B1 * | 10/2002 | Pintsov | 700/227 |
| 6,983,194 B1 * | 1/2006 | Stadermann | 700/213 |
| 2001/0032181 A1 | 10/2001 | Jakstadt et al. | |
| 2001/0044785 A1 | 11/2001 | Stolfo et al. | |
| 2002/0049672 A1 | 4/2002 | Kitchen et al. | |
| 2003/0023561 A1 | 1/2003 | Stefik et al. | |
| 2003/0077409 A1 | 4/2003 | Schnell | |
| 2004/0002903 A1 | 1/2004 | Stolfo et al. | |
| 2005/0033659 A1 | 2/2005 | Zucker et al. | |

FOREIGN PATENT DOCUMENTS

| | | |
|---|---|---|
| WO | WO 97/12460 | 4/1997 |
| WO | WO 99/66428 | 12/1999 |
| WO | WO 00/13368 | 3/2000 |
| WO | WO 01/00069 A2 | 1/2001 |
| WO | WO 01/18718 A1 | 3/2001 |
| WO | WO 01/65444 A1 | 9/2001 |
| WO | WO 01/99005 A1 | 12/2001 |
| WO | WO 01/99009 A2 | 12/2001 |
| WO | WO 01/99037 A1 | 12/2001 |
| WO | WO 02/21315 A1 | 3/2002 |
| WO | WO 02/066344 A1 | 8/2002 |
| WO | WO 02/079947 A2 | 10/2002 |
| WO | WO 03/023677 A1 | 3/2003 |

OTHER PUBLICATIONS

"Faster Freight: couriers and expedited carriers broaden their approach to better serve Canadian shippers". Materials Management and Distribution. Toronto: Oct. 1996, vol. 41, Issue 10; p. 34 [retrieved from ProQuest Dec. 19, 2005] (2 pages).

"A new look for MSDS". Campbell, Sharon Lynn. Occupational Health and Safety. Waco: Jun. 1992. vol. 61, Issue 6; p. 62 [retrieved from ProQuest Dec. 19, 2005] (5 pages).

"American express invests in Respond.com," M2 Presswire, Mar. 9, 2000 [recovered from Dialog database on May 16, 2007] (2 pages).

"Purchasing tools for the Internet toolbox," Carbone, Jim, Purchasing, vol. 123, Dec. 11, 1997 [recovered from Dialog database on May 16, 2007] (5 pages).

Campbell et al., "Systems and Methods for Authenticating an Electronic Message," Pending U.S. Appl. No. 09/675,667, filed Sep. 29, 2000.

Campbell et al., "Methods and Systems for Proofing Identities Using a Certificate Authority," Pending U.S. Appl. No. 09/809,325, filed Mar. 16, 2001.

Orbke et al., "Methods and Systems for Establishing an Electronic Account for a Customer," Pending U.S. Appl. No. 09/809,328, filed Mar. 16, 2001.

Cook et al., "Methods and Systems for Providing a Secure Electronic Mailbox," Pending U.S. Appl. No. 09/809,312, filed Mar. 16, 2001.

Campbell et al., "Methods and Systems for Providing an Electronic Account to a Customer," Pending U.S. Appl. No. 09/809,581, filed Mar. 16, 2001.

Cook et al., "Methods and Systems for Linking an Electronic Address to a Physical Address of a Customer," Pending U.S. Appl. No. 09/809,326, filed Mar. 16, 2001.

Estes et al., "System, Method, and Article of Manufacturing for Shipping a Package Privately to a Customer," Pending U.S. Appl. No. 10/311,748, corresponding to international application No. PCT/US01/19384, international filing date: Jun. 19, 2001 (specification provided as WO 01/99005 A1).

Krause et al., "Systems and Methods for Electronic Message Content Identification," Pending U.S. Appl. No. 10/311,743, corresponding to international application No. PCT/US01/19698, international filing date: Jun. 20, 2001 (specification provided as WO 01/99009 A2).

Replacement Sheet for p. 1 of international application No. PCT/US01/19698 (published as WO 01/99009 A2) submitted to U.S. Patent and Trademark Office, Box PCT, on Jan. 18, 2002.

Buie et al., "Systems and Methods for Providing Mail Item Retrieval," Pending U.S. Appl. No. 10/311,742, corresponding to international application No. PCT/US01/19421, international filing date: Jun. 19, 2001 (specification provided as WO 01/99037 A1).

Campbell, "Systems and Methods for Providing Electronic Archiving," Pending U.S. Appl. No. 10/362,506, corresponding to international application No. PCT/US01/27690, international filing date: Sep. 7, 2001 (specification provided as WO 02/21315 A1).

Aldstadt, "Item Tracking and Anticipated Delivery Confirmation System Method," Pending U.S. Appl. No. 10/488,762, corresponding to international application No. PCT/US01/28001, international filing date: Sep. 7, 2001 (specification provided as WO 03/023677 A1).

Devar, "Universal Delivery and Collection Box Unit (UDCBU)," Pending U.S. Appl. No. 10/468,364, corresponding to international application No. PCT/US02/04866, international filing date: Feb. 20, 2002 (specification provided as WO 02/066344 A1).

Devar, "Universal Delivery and Collection Box Unit," Pending U.S. Appl. No. 10/473,873, corresponding to international application No. PCT/US02/09870, international filing date: Apr. 2, 2002 (specification provided as WO 02/079947 A2).

International Search Report, PCT/US00/27068, mailed May 4, 2001 (4 pages).

International Search Report in PCT/US01/23177, mailed Oct. 18, 2001 (4 pages).

International Search Report in PCT/US01/19384, mailed Nov. 16, 2001 (6 pages).

International Search Report in PCT/US01/19421, mailed Nov. 19, 2001 (6 pages).
International Search Report in PCT/US01/27690, mailed Nov. 19, 2001 (5 pages).
International Search Report in PCT/US01/28001, mailed Dec. 21, 2001 (7 pages).
International Search Report in PCT/US01/08490, mailed Jan. 22, 2002 (6 pages).
International Search Report in PCT/US02/04866, mailed May 23, 2002 (1 page).
International Search Report in PCT/US02/09870, mailed Dec. 5, 2002 (2 pages).
International Preliminary Examination Report in PCT/US01/08487, mailed Jan. 23, 2002 (4 pages).
International Preliminary Examination Report in PCT/US01/23177, mailed May 3, 2002 (4 pages).
International Preliminary Examination Report in PCT/US01/19421, mailed May 16, 2002 (4 pages).
International Preliminary Examination Report in PCT/US01/19384, mailed Jan. 17, 2003 (4 pages).
International Preliminary Examination Report in PCT/US01/08488, mailed Jun. 11, 2003 (10 pages).
International Preliminary Examination Report in PCT/US01/28001, mailed Aug. 8, 2003 (4 pages).
PCT Written Opinion (PCT Rule 66) in PCT/US01/19384, mailed Jun. 17, 2002 (4 pages).
PCT Written Opinion (PCT Rule 66) in PCT/US01/08488, mailed Oct. 28, 2002 (9 pages).
PCT Written Opinion (PCT Rule 66) in PCT/US02/09870, mailed Mar. 6, 2003 (5 pages).
PCT Written Opinion (PCT Rule 66) in PCT/US02/04866, mailed May 23, 2003 (4 pages).
Appendix K (USPS Burke Test Site Report), "User Interface Review of Mail Item Retrieval System (MIRS), Burke Station, Burke Virginia" (Dec. 24, 1998); appendix of USPS Mail Item Retrieval System (MIRS) Phase 2 Limited Production Self-Service Statement of Work (SOW) (SOW can be found in U.S. Appl. No. 60/255,407, filed Dec. 15, 2000, which is incorporated by reference into Pending U.S. Appl. No. 10/311,742, filed Dec. 19, 2002).
Appendix L, "In-plant Test Report (Re-Test Failed Items), Mail Item Retrieval System (MIRS)" (Oct. 21, 1998); appendix of USPS Mail Item Retrieval System (MIRS) Phase 2 Limited Production Self-Service Statement of Work (SOW) (SOW can be found in U.S. Appl. No. 60/255,407, filed Dec. 15, 2000, which is incorporated by reference into Pending U.S. Appl. No. 10/311,742, filed Dec. 19, 2002).
Appendix M, "Heuristic Evaluation of the USPS Mail Item Retrieval System Early Prototype," by R. Hoffman and E. Nelson, Mitretek Systems (May 11, 1998); appendix of USPS Mail Item Retrieval System (MIRS) Phase 2 Limited Production Self-Service Statement of Work (SOW) (SOW can be found in U.S. Appl. No. 60/255,407, filed Dec. 15, 2000, which is incorporated by reference into Pending U.S. Appl. No. 10/311,742, filed Dec. 19, 2002).
Bartholomew, D., "The Future of Snail Mail: the Postal Service Is Gearing up for Competition. But Can It Deliver?," InformationWeek, Dec. 4, 1995, starting p. 34, retrieved from DIALOG, DIALOG No. 08306634 (6 pages).
Bhushan, B. et al., "Federated Accounting: Service Charging and Billing in a Business-to-Business Environment," 2001 IEEE/IFIP International Symposium, May 14-18, 2001, pp. 107-121.
"CONNECT announces OneServer interactive online application platform," Business Wire, Apr. 10, 1995, p. 4101043, retrieved from DIALOG, DIALOG No. 07797909 (2 pages).
Czerny, M., "Customer Account Management System for STEWEAG Key Accounts," CIRED 97 Conference Publication No. 438, Jun. 2-5, 1997, pp. 5.6.1 to 5.6.5.
eBusiness Tools, FedEx® Ship Manager Software [online], pp. 1-2, FedEx® [retrieved on Nov. 28, 2001]. Retrieved from the Internet: <URL: www.fedex.com/us/ebusiness/eshipping/ship.html>.
Fast Facts, Back Issue [online], pp. 1-4, FedEx® Oct. 11, 2000 [retrieved on Nov. 28, 2001]. Retrieved from the Internet: <URL: www.fedex.com/us/customer/fastfacts/backissues/101100fastfacts.html>.
"Joint Direct Bill Payment Form for Mich. Utilities," Bank Technology News, Apr. 1994, p. 8, retrieved from DIALOG, DIALOG No. 03302326 (1 page).
Newkirk, K.M., "Banks Can Slice Transaction Costs," Independent Banker, Dec. 1995, vol. 45, No. 12, pp. 52-53, retrieved from DIALOG, DIALOG No. 00276769 (3 pages).
Selected pp. (9-11, 18-19, 28-32) from "Recommendation F.400/X. 400 Message Handling and Directory Services—Operation and Definition of Service," Nov. 14, 1988, CCITT, Melbourne, XP002186347 (10 pages).
Stafford, C.D. et al., "Delivering Marketing Expertise to the Front Lines," IEEE Expert, Apr. 1994, pp. 23-32.

* cited by examiner

ITEM ATTRIBUTE PREVERIFICATION

RELATED APPLICATION

Under provisions of 35 U.S.C. §119(e), the Applicant claims the benefit of U.S. provisional application No. 60/220,602 filed Jul. 25, 2000, which is incorporated herein by reference.

TECHNICAL FIELD

The present invention relates to the field of providing item attribute verification. More particularly, the present invention, in various specific embodiments, involves methods and systems directed to providing a verification of attributes of an item before the item is placed in a delivery system.

BACKGROUND

The United States Postal Service (USPS) is an independent government agency that provides mail delivery and other services to the public. The USPS is widely recognized as a safe and reliable means for sending and receiving mail and other items. With the advent and steady growth of electronic mail and electronic commerce, the physical mail stream will increasingly be utilized for sending and receiving packages. In an effort to lower operating costs and increase value for their customer base, many high volume delivery users prepare packages and other items with automated equipment and presort and label the items prior to placement of the items into the delivery system. Delivery users realize a cost savings due to presorting, for example, because many delivery system operators provide discounts on presorted items because the amount of sorting necessary by the delivery system operator is reduced.

Therefore, there is a need for the United States Postal Service and many other organizations to efficiently provide item verification in order to confirm that items are compatible with the delivery system and to confirm that the delivery fees for the items are proper. More specifically, delivery system operators desire to efficiently provide verification of an item before the item is placed in a delivery system. This is because in an increasingly competitive environment, it is essential for a service provider to reduce costs and exceed the expectations of those who receive a service.

One solution to the item verification problem is for the delivery system operator to receive unconfirmed information relative to a group of items placed in the delivery system and for the delivery system operator to randomly check individual items within the group for compliance with the unconfirmed information. For example, a catalog retail company may wish to have a plurality of catalogs sent to a group of prospective customers. In doing so, the company prepares items by placing a plurality of catalogs into a plurality of packages and places address labels, postage and tracking indicia on the items. Sorting the items to some extent, the company may deliver the items to the delivery system operator along with a manifest showing how the company believes the items were sorted along with the size, weight and postage amount placed on the items (this manifest may not necessarily reflect how the items were actually sorted or accurate weight, size, or postage). In this situation, having no verification of the information combined in the manifest, the delivery system operator must perform some checking of the items. This checking may comprise a random sampling of the items to determine some probabilistic certainty of the accuracy of the manifest.

Great inefficiencies are created in this procedure because, for example, the delivery system operator must perform a verification, expending money and human resources. In addition, the sampling is random and thus each item is not checked for accuracy of attributes or for sorting accuracy. Accordingly, efficiently providing item attribute verification remains an elusive goal. Thus, there remains a need for efficiently providing item attribute verification in a delivery system. In addition, there remains a need for efficiently providing item attribute verification prior to placing the item in the delivery system.

SUMMARY OF THE INVENTION

In one aspect, a method for providing item attribute verification consistent with the invention includes obtaining the attributes of the item prior to placing the item in a delivery system, verifying correctness of the attributes, and transmitting an indication of the correctness of the attributes to a delivery system operator over a communications system.

In another aspect, a system for providing item attribute verification comprises a component for obtaining the attributes of the item prior to placing the item in a delivery system, a component for verifying correctness of the attributes, and a component for transmitting an indication of the correctness of the attributes to a delivery system operator over a communications system.

Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention. In the drawings.

DETAILED DESCRIPTION

Figure 1:
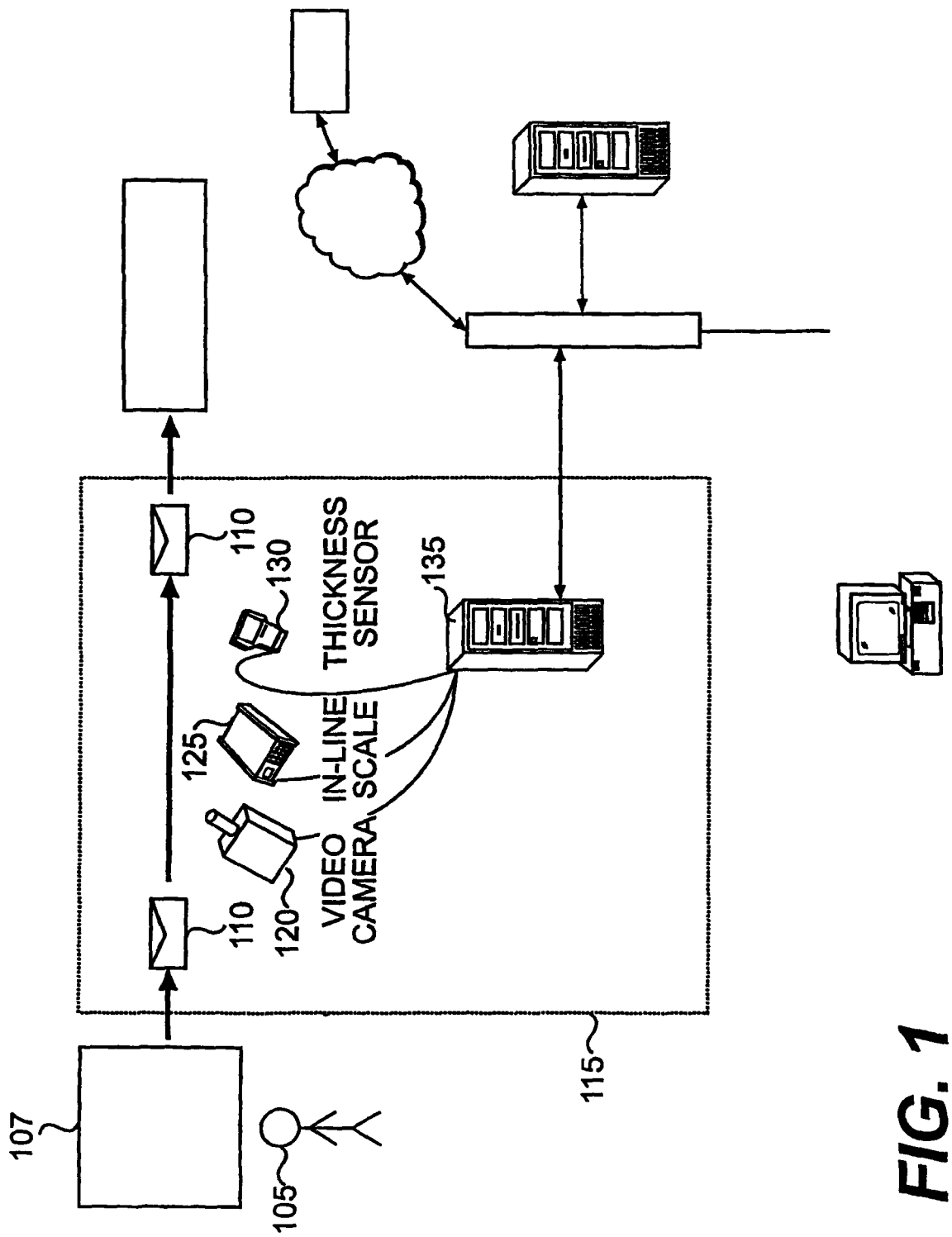
FIG. 1 is a functional block diagram of a system for providing item verification consistent with the present invention.

Reference will now be made to various embodiments consistent with this invention, examples of which are shown in the accompanying drawings and will be obvious from the description of the invention. In the drawings, the same reference numbers represent the same or similar elements in the different drawings whenever possible.

Figure 2:
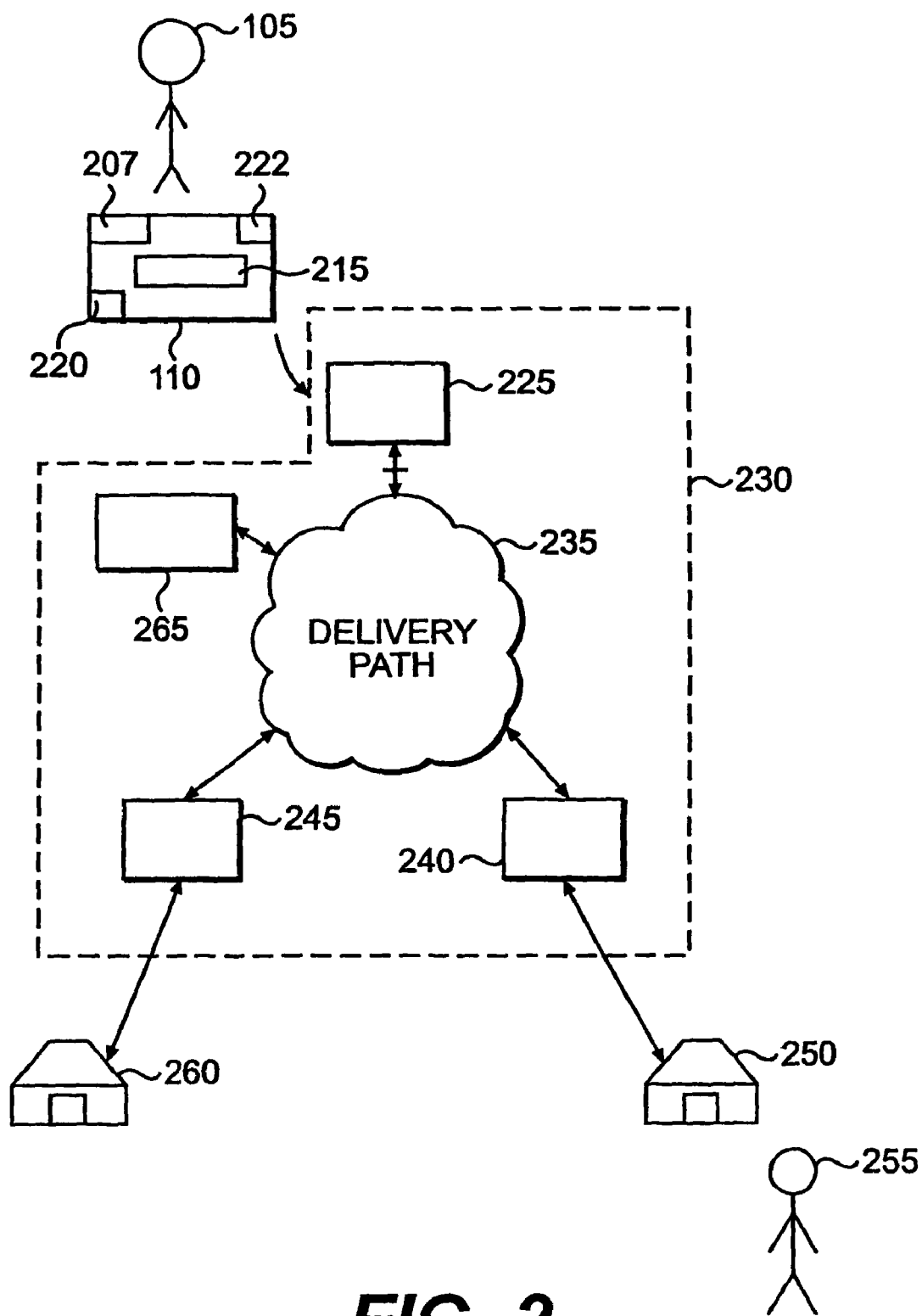
FIG. 2 is a functional block diagram of a system for providing item delivery consistent with the present invention.

Referring to FIG. 1 and FIG. 2, an embodiment consistent with the present invention provides an item verification system 100. Within item verification system 100, for example, an item 110 can be prepared utilizing an inserter 107 under the supervision of a user 105. Inserter 107 is an automated device capable of assembling item 110 which may comprise a mailpiece, a United States Postal Service Priority Mail package, or a United States Postal Service Express Mail package. While item 110 may comprise any of the aforementioned, those skilled in the art will appreciate that still many other types of items may be utilized.

In this embodiment, inserter 107 places materials in item 110 that user 105 wishes to send to a recipient 255 (FIG. 2). With the materials placed in item 110, an address label 215 indicating a first address 250 of recipient 255 and a return address 207 indicating where to return item 110 if necessary are placed on item 110. In addition, a tracking indicia 220 is placed on item 110 along with a delivery payment coding 222. Tracking indicia 220 is utilized by a delivery system operator to facilitate the delivery of item 110. The use of tracking indicia 220 will be discussed in greater detail below. Delivery payment coding 222 indicates the payment amount user 105 believes is required by the delivery system operator to deliver item 110 to recipient 255. Delivery payment coding 222 may comprise a bar code, an image indicating an account from which delivery payment has been made, a postage stamp, or other types of codings as is known by those skilled in the art.

Tracking indicia 220 may comprise a bar code, a PLANET code or other types of indicia as is known by those skilled in the art. A bar code is a printed symbol used for recognition by a bar code scanner (reader). Traditional one-dimensional bar codes use the bar's width to encode a product or account number. Two-dimensional bar codes, such as PDF417, MAXICODE and DATAMATRIX, are scanned horizontally and vertically and hold considerably more data. Generally, PDF417 is widely used for general purposes, MAXICODE is used for high-speed sorting, and DATAMATRIX is used for marking small parts.

Historically, some delivery system operators sorted flat mail using POSTNET, a 12-digit barcode consisting of alternating long and short bars indicating the destination of, for example, a mailpiece. Responding to the expanding needs of users, particularly heavy volume users, PLANET code was developed on the foundation of the existing technical infrastructure. The PLANET Code is the opposite of the current POSTNET codes, reversing long bars for short and short bars for long. This innovation offers the convenience of a bar code that is easily applied using current bar-coding methods, and is readily scanned by the high-speed automation equipment already located in the plurality of plants comprising delivery system 230.

After item 110 is built utilizing inserter 107, item 110 is passed through a weighing and image capturing system 115 and is then stacked at a staging facility 160. Item 110 is passed through weighing and image capturing system 115 to obtain the weight of item 110, to obtain the image of item 110, and to determine the thickness of item 110 while item 110 is moving. In the present embodiment, weighing and image capturing system 115 comprises a video camera 120, an in-line scale 125, a thickness sensor 130, and a weighing and image capturing server 135. While video camera 120, in-line scale 125, and thickness sensor 130 may be utilized to obtain the image, weight, and thickness of item 110 respectively, those skilled in the art will appreciate that may other devices may be utilized to obtain this type of data. With the image, weight, and thickness of item 110 obtained, this data is stored in weighing and image capturing server 135.

From weighing and image capturing server 135, the image, weight, and thickness of item 110 is transmitted to a user server 140 and a verification server 145 over a network 165. Network 165 may comprise, for example, a local area network (LAN) or a wide area network (WAN). Such networking environments are commonplace in offices, enterprise-wide computer networks, intranets, and the Internet and are known by those skilled in the art. When a LAN is used as network 165, weighing and image capturing server 135, user server 140, and verification server 145 are connected to the network 165 through a network interface located at each of the respective servers. When a WAN networking environment is utilized as network 165, weighing and image capturing server 135, user server 140, and verification server 145 each typically include an internal or external modem (not shown) or other means for establishing communications over the WAN, such as the Internet.

Once verification server 145 receives the image, weight, and thickness of item 110 from weighing and image capturing server 135, this data is analyzed for correctness. Examples of this analysis, as discussed in greater detail with respect to FIG. 6A and FIG. 6B below, are a determination of the correctness of delivery payment coding 222, the readability of tracking indicia 220, the correctness of tracking indicia 220, and a determination of the correctness of how item 110 was sorted. The preceding analysis is exemplary and those skilled in the art will appreciate that many other attributes may be obtained and many other aspects of item 110 many be analyzed.

In addition to analyzing attributes of item 110, a correlation between how item 110 was actually sorted and master sort data contained in a master sort data file 170 is determined. Master sort data file 170 (FIG. 1) may be sent from user server 140 to verification server 145 over network 165 or via physical media and contains data as to how user 105 believes item 110 or a plurality of items was or are to be processed and sorted by inserter 107 and stacked in staging area 160. The master sort data can be used for determining the appropriate amount of compensation for user 105 to pay the delivery system operator for delivering item 110 or a plurality of items. The correlation between how item 110 was actually sorted and master sort data contained in master sort data file 170 will be discussed in greater detail below with respect to FIG. 7.

After a correlation between how item 110 was actually sorted and the master sort data contained in master sort data file 170 is determined, the correlation data, along with the image, weight, and thickness of item 110 are transmitted from verification server 145 to a delivery system operator server 155 over a communications system 150. Before the correlation data, image, weight and thickness of item 110 are transmitted, however, this data may be encrypted to insure data security. When encrypting, the data may be converted into a secret code for transmission over a public network. The original file, or "plaintext," may be converted into a coded equivalent called "ciphertext" via an encryption algorithm executed on verification server 145. The ciphertext is decoded (decrypted) at delivery system operator server 155 and turned back into plaintext.

The encryption algorithm executed on verification server 145 may use a key, which is a binary number that is typically from 40 to 128 bits in length. The greater the number of bits in the key (cipher strength), the more possible key combinations and the longer it would take to break the code. The data is encrypted, or "locked," by combining the bits in the key mathematically with the data bits. At the receiving end, the key is used to "unlock" the code and restore the original data.

There are two main cryptographic methods suitable for use with the present system. The traditional method uses a secret key, such as the Data Encryption Standard (DES). In DES, both sender and receiver use the same key to encrypt and decrypt. This is the fastest method, but transmitting the secret key to the recipient in the first place is not secure. The second method is public-key cryptography, such as the Rivest-Shamir-Adleman (RSA) highly-secure cryptography method by RSA Data Security, Inc., Redwood City, Calif., (www.rsa.com). RSA uses a two-part concept with both a private and a public key. The private key is kept by the owner; the public key is published. Each recipient has a private key that is kept secret and a public key that is published for everyone. The sender looks up the recipient's public key and uses it to encrypt the message. The recipient uses the private key to decrypt the message. Owners never have a need to transmit their private keys to anyone in order to have their messages decrypted, thus the private keys are not in transit and are not vulnerable.

Public key cryptography software marketed under the name Pretty Good Privacy (PGP) from Pretty Good Privacy, Inc., (PGP) of San Mateo, Calif., (www.pgp.com) may be utilized in this embodiment. PGP was developed by Phil Zimmermann, founder of the company, and it is based on the RSA cryptographic method. A version for personal, non-business use is available on various Internet hosts. While PGP may be used to encrypt the correlation data, image data, weight data and thickness data of item 110 before it is sent from verification server 145 to delivery system operator server 155, those skilled in the art will appreciate that many other types of encryption algorithms, methods and schemes may be employed.

In the present embodiment, preferred methods of the invention utilize weighing and image capturing server 135, user server 140, verification server 145, and delivery system operator server 155, which are typically personal computers or other similar microcomputer-based workstations. Those skilled in the art, however, will appreciate that weighing and image capturing server 135, user server 140, verification server 145, and delivery system operator server 155 may comprise any type of computer operating environment such as hand-held devices, multiprocessor systems, microprocessor-based or programmable consumer electronics, minicomputers, mainframe computers, and the like. Weighing and image capturing server 135, user server 140, verification server 145, and delivery system operator server 155 may also be practiced in distributed computing environments where tasks are performed by remote processing devices and may have the capability of connecting to a communications system 150.

If the Internet is utilized as communications system 150, this connection may be made utilizing e-mail generally through the use of a standard e-mail software package such as OUTLOOK from Microsoft Corporation or GROUPWISE from Novell, Inc. In this example where communications system 150 is the Internet, user 105, and the delivery system operator typically connect user server 140, verification server 145, and delivery system operator server 155 respectively to the Internet through an Internet service provider (ISP) (not shown), in the manner known to those skilled in the art. In addition to Internet based e-mail, system operator server 155 may communicate with verification server 145 over communications system 150 utilizing regular mail, facsimile, web pages, or an interactive voice response systems. Those skilled in the art will appreciate that many other types of communications systems may be used as communications system 150. Also, network 165 and communications system 150 may comprise the same or similar system or structure.

In addition to a wire line communications system 150, or wire line network 165, a wireless communications system 150 or wireless network 165 may be utilized. "Wireless" can be defined as radio transmission via the airwaves, however, those skilled in the art will appreciate that various other communication techniques can be used to provide wireless transmission including infrared line of sight, cellular, microwave, satellite, packet radio, and spread spectrum radio. Weighing and image capturing server 135, user server 140, verification server 145, and delivery system operator server 155 in the wireless environment can be any mobile terminal such as a smart phone, personal digital assistant (PDA), intelligent pager, portable computer, hand held computer, or any device capable of receiving wireless data. Wireless data may include, but is not limited to, paging, text messaging, e-mail, Internet access, and other specialized data applications specifically excluding voice transmission. A PDA is a handheld computer that serves as an organizer for personal information. It generally includes at least a name and address database, to-do list and note taker. PDAs are typically pen-based and use a stylus ("pen") to tap selections on menus and to enter printed characters. The unit may also include a small on-screen keyboard which is tapped with the pen. Data may be synchronized between the PDA and a desktop computer through a cable or wireless transmissions.

FIG. 2 shows an item delivery system 200 consistent with the present invention. For example, user 105 places item 110 or a plurality of items into a delivery system 230 once processing has been completed by item verification system 100. As built by inserter 107, item 110 contains address label 215 indicating first address 250 of recipient 255 and return address 207 indicating where to return item 110 if necessary. Item 110 is routed through delivery system 230. Delivery system 230 comprises a sender plant 225, a delivery path 235, a first address plant 240, an alternative address plant 245, and an alternative processing point 265. Delivery path 235 comprises a plurality of plants similar to sender plant 225, first address plant 240 and alternative address plant 245. The plants within delivery path 235 contain, among other things, automated systems and sorting equipment and are designed to receive and process a plurality of items. Delivery system 230 is configured to sense tracking indicia 220 placed on item 110 as it passes through the elements of delivery system 230 directing the movement of item 110 through delivery system 230. The tracking indicia 220 sensed by delivery system 230 may comprise a bar code or a PLANET code as described herein above.

In the item verification and delivery process, item 110 is sent through delivery system 230 by user 105 to first address plant 240. At any time in the delivery process a determination may be made as to whether item 110 is undeliverable. If it is determined that item 110 is undeliverable, item 110 may be forwarded to alternative processing point 265 where an ancillary service may be performed. Examples of such ancillary services are recycle service (treating item 110 as waste), NIXIE service, and Computerized Forwarding Service (CFS).

With respect to NIXIE service, NIXIE is a classification given to an item that cannot be sorted or is undeliverable-as-addressed because of an incorrect, illegible, or insufficient delivery address. If item 110 is undeliverable-as-addressed, address correction service (re-label with a correct address) or return service (return item to the sender) may be performed.

In this case, a NIXIE operator specialized in the handling of such items is required. If item 110 requires return service, return address 207 on item 110 is read and item 110 is sent to return address 207 accordingly. Return address 207 is an element of item 110 that is usually placed in the upper left corner of item 110 to indicate the address of user 105. This address indicates where user 105 wants item 110 returned if it is undeliverable. In addition return address 207 may indicate where user 105 will receive a bill for any fees due for the return of item 110. When item 110 requires address correction service, a NIXIE operator obtains the proper address of recipient 255 or the reason for non-delivery. While NIXIE processing may comprise address correction service or return service, those skilled in the art will appreciate that may other types of NIXIE processing may be performed.

Computerized forwarding service is a centralized, computerized address label-generating operation that forwards undeliverable-as-addressed items to recipients. In this case, recipient 255 pre-registers an alternative address 260 with the delivery system operator in order to have all items forwarded to alternative address 260. For example, when recipient 255 moves and wishes to have items sent to alternative address 260, recipient 255 notifies the delivery system operator of alternative address 260. Once the delivery system operator is notified of alternative address 260, all items sent to first address 250 are detected by delivery system 230, re-labeled, and then forwarded to alternative address 260. In the aforementioned computerized forwarding service, items are forwarded only for a specific period of time. The delivery system operator expects recipient 255 to contact each and every sender who recipient 155 may expect to receive an item and notify the possible senders of the address change of recipient 255. After the computerized forwarding service time period is complete, the delivery system operator will cease forwarding items to recipient 255 and will return to the user 105 all items sent to first address 250.

If ancillary services were required, item 110 may remain at alternative processing point 265 or may be processed at an item recovery section of alternative processing point 265. Item 110 may be recovered by user 105 or recipient 255 upon the completion of a tracer. A tracer is a form completed by user 105 or recipient 255 to locate delayed or undelivered items. While item recovery may occur at alternative processing point 265, those skilled in the art will appreciate that may other types of processing may be performed at alternative processing point 265.

Figure 3:
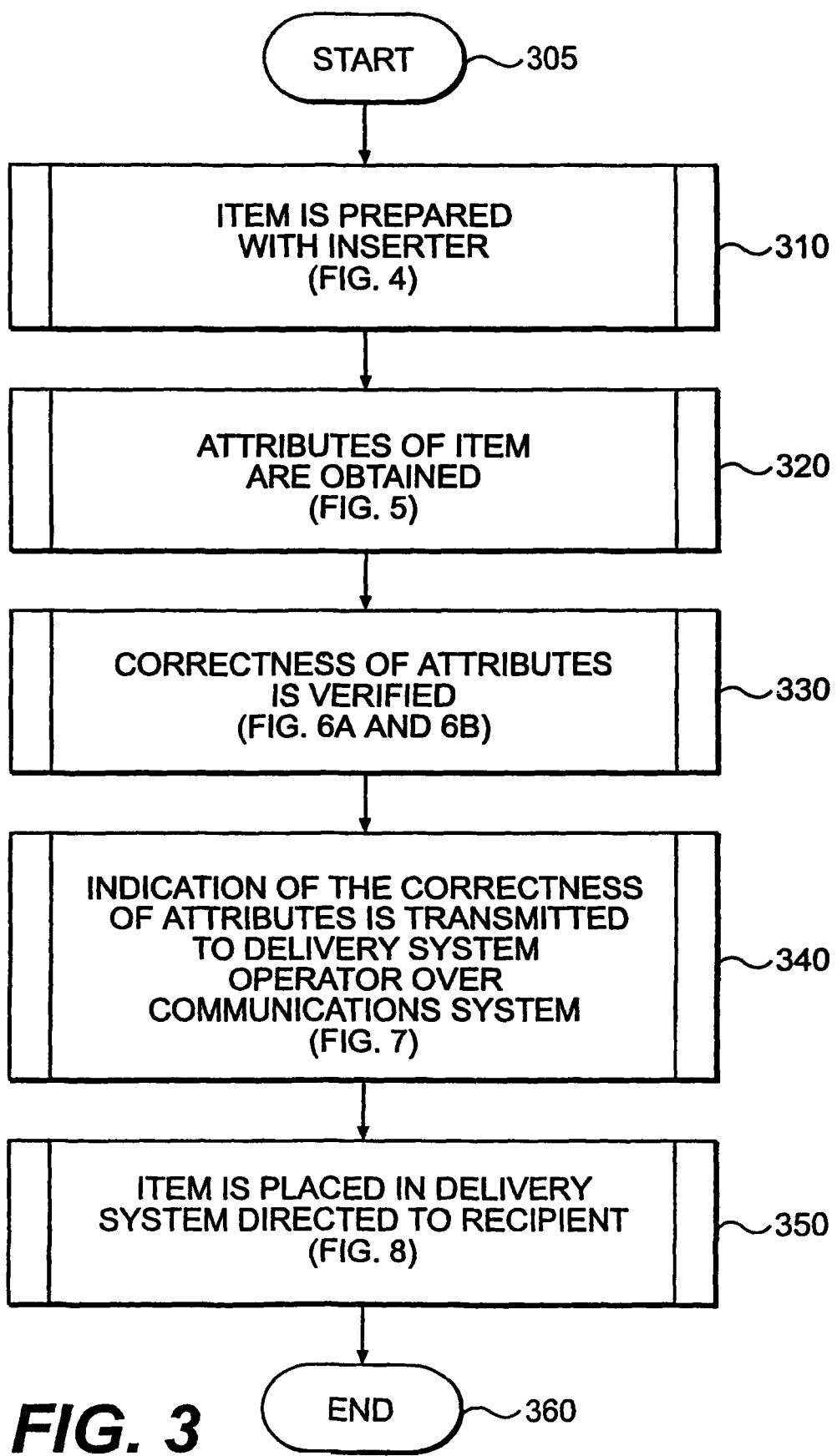
FIG. 3 is a flow chart of an exemplary method for providing item verification consistent with the present invention.
Figure 4:
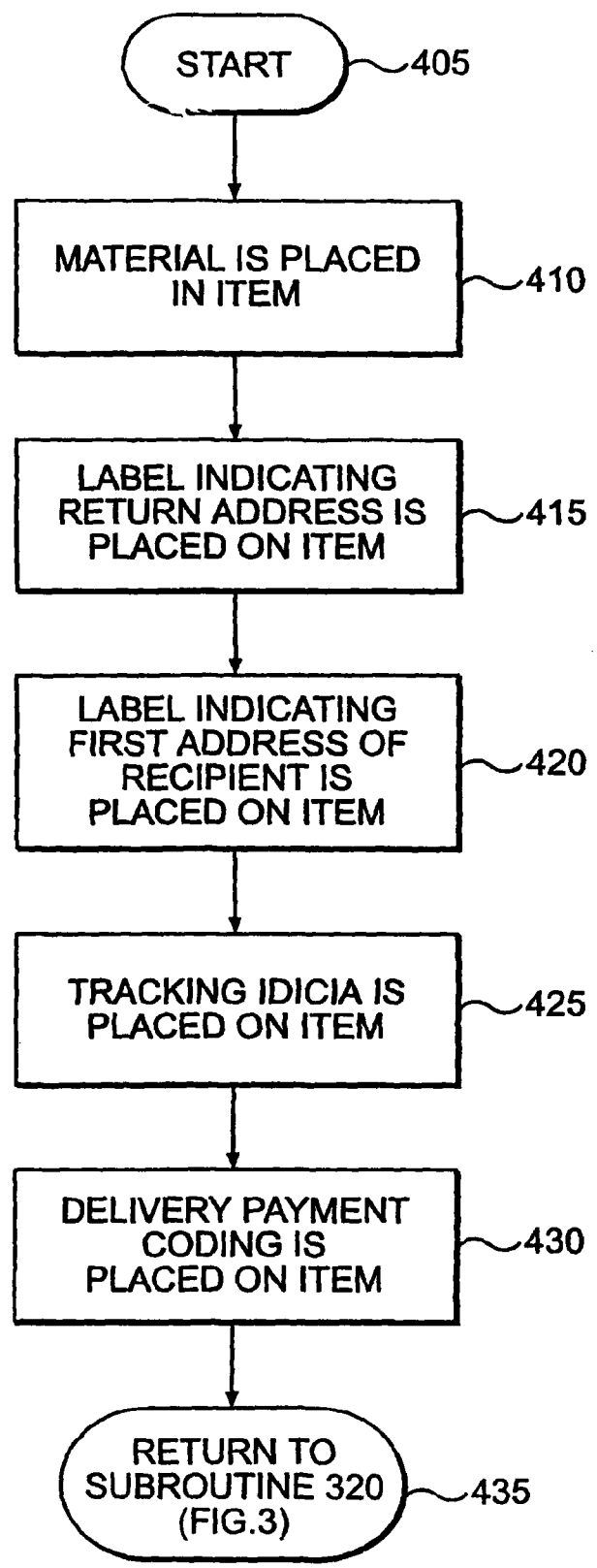
FIG. 4 is a flow chart of an exemplary subroutine used in the exemplary method of FIG. 3 for preparing an item with an inserter.

FIG. 3 is a flow chart setting forth the general stages involved in an exemplary method 300 for verifying the attributes of item 110. The implementation of the stages of method 300 consistent with the present invention will be described in greater detail in FIG. 4 through FIG. 8. Method 300 begins at starting block 305 and proceeds to exemplary subroutine 310 where item 110 is built with inserter 107. The stages of subroutine 310 are shown in FIG. 4 and will be described in greater detail below.

Figure 5:
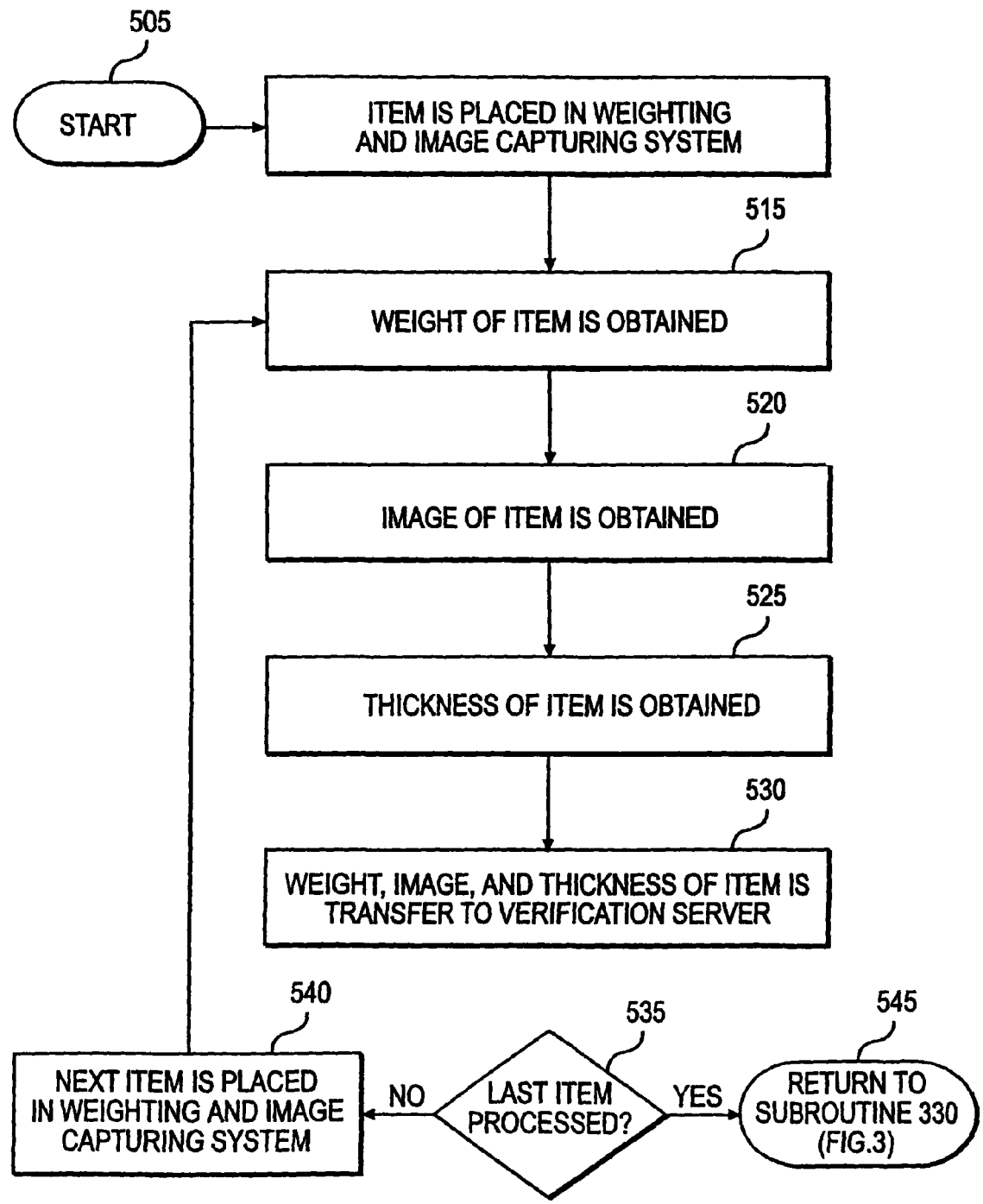
FIG. 5 is a flow chart of an exemplary subroutine used in the exemplary method of FIG. 3 for obtaining attributes of the item.

From exemplary subroutine 310, method 300 advances to subroutine 320 where attributes of item 110 are obtained. The stages of subroutine 320 are shown in FIG. 5 and will be described in greater detail below.

Figure 6A:
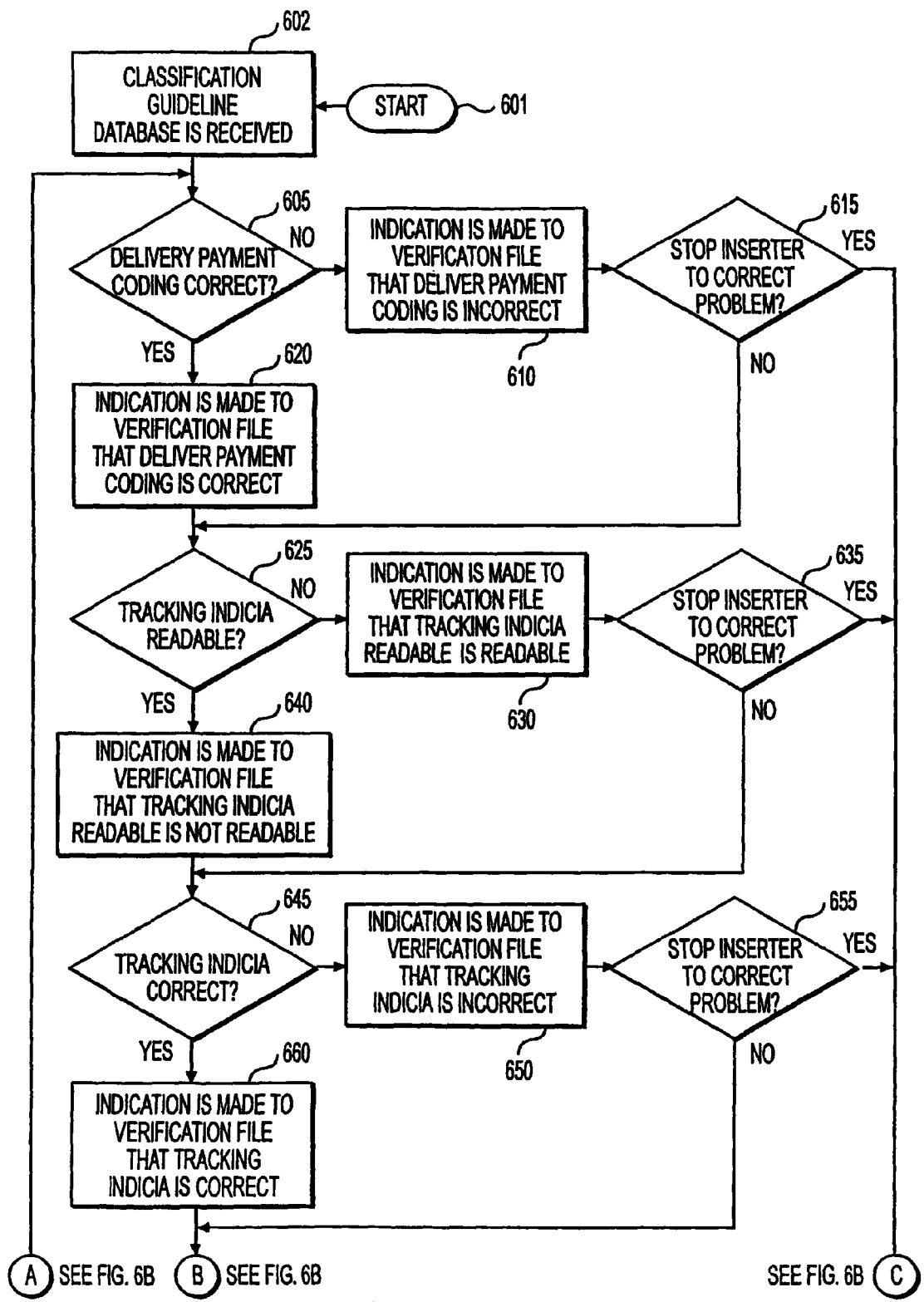
FIG. 6A is a flow chart of an exemplary subroutine used in the exemplary method of FIG. 3 for verifying the correctness of the attributes.
Figure 6B:
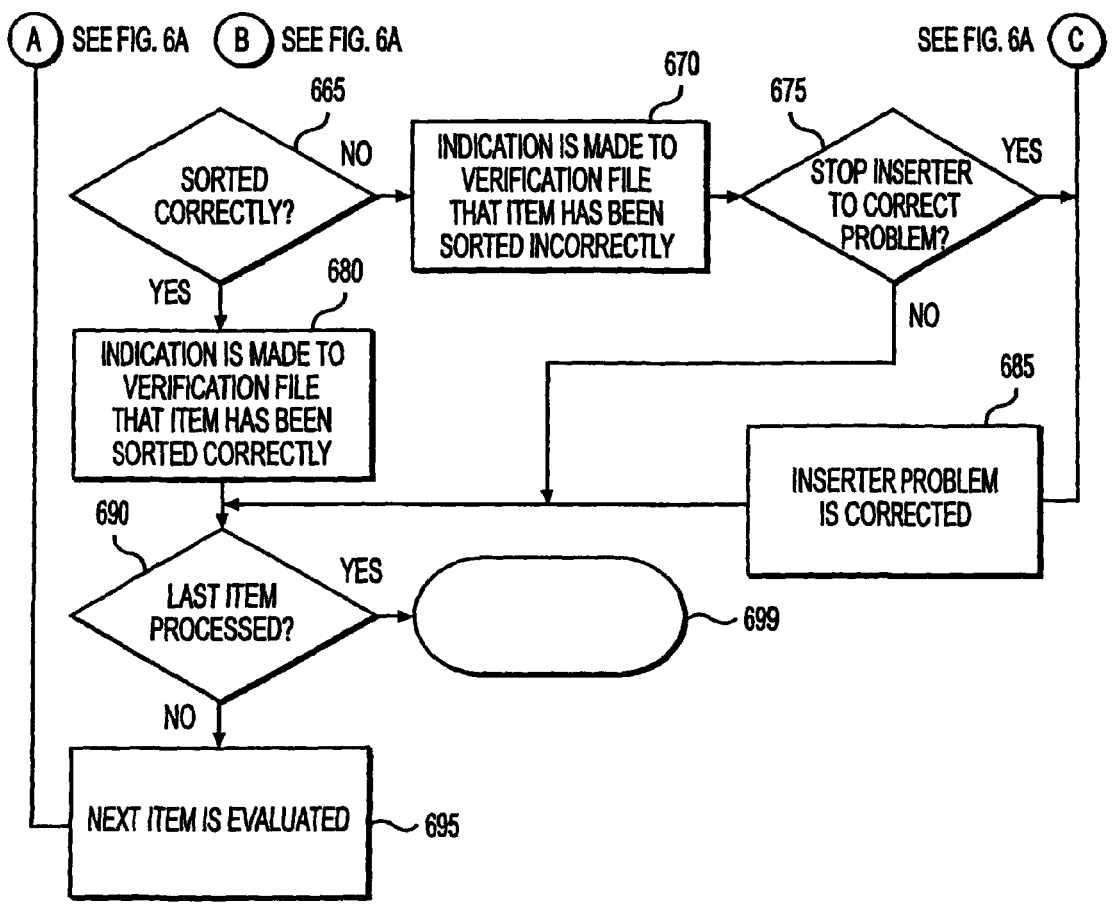
FIG. 6B is a continuation of the flow chart of FIG. 6A which is an exemplary subroutine used in the exemplary method of FIG. 3 for verifying the correctness of the attributes.

Once attributes of item 110 are obtained in subroutine 320, method 300 continues to subroutine 330 where the correctness of the attributes is verified. The stages of subroutine 330 are shown in FIG. 6A and FIG. 6B and will be described in greater detail below.

Figure 7:
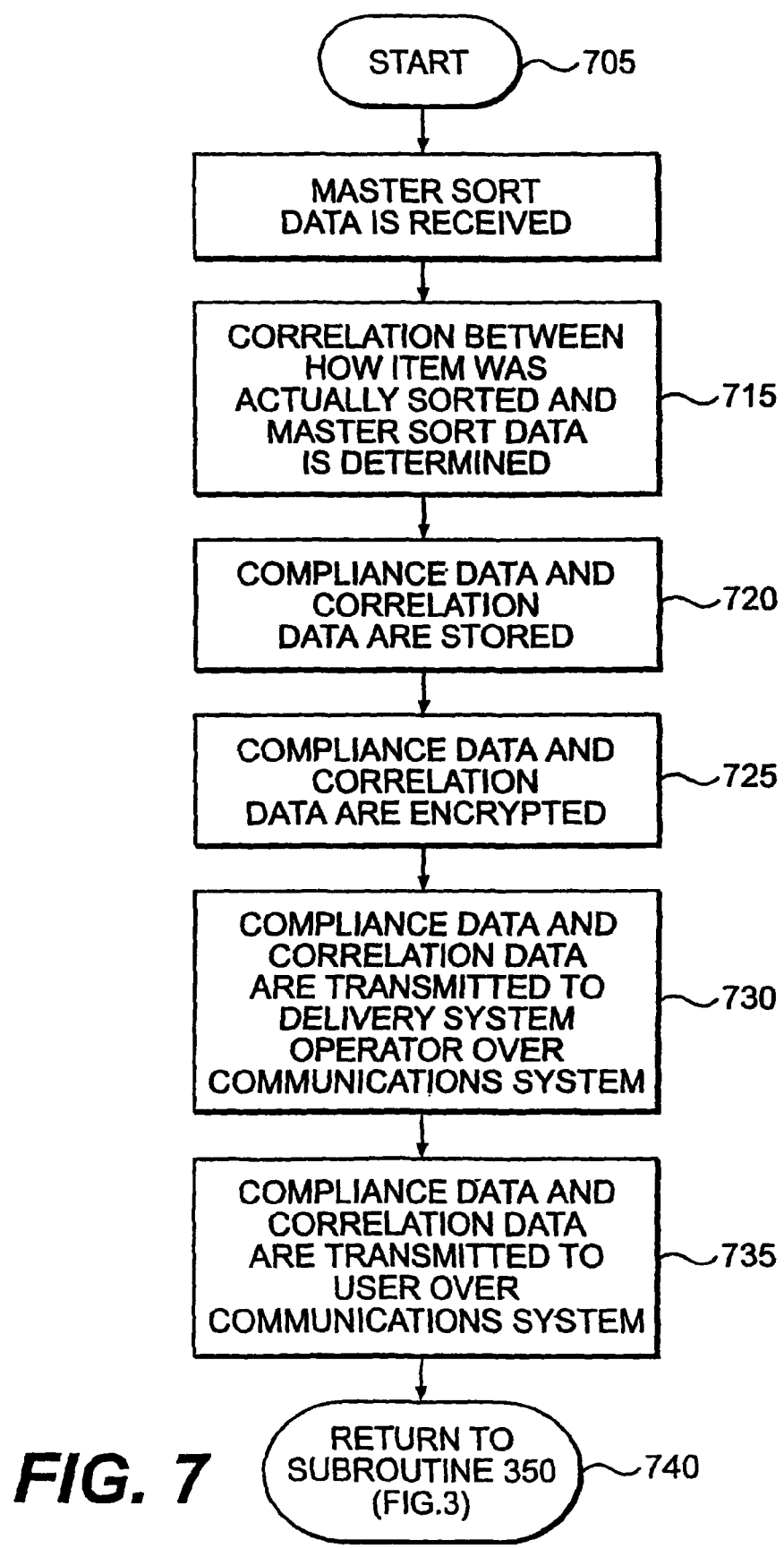
FIG. 7 is a flow chart of an exemplary subroutine used in the exemplary method of FIG. 3 for transmitting an indication of the correctness of the attributes to the delivery system operator over the communications system.

After correctness of the attributes is verified in subroutine 330, method 300 advances to subroutine 340 where an indication of the correctness of the attributes is transmitted to the delivery system operator over communications system 150. The stages of subroutine 340 are shown in FIG. 7 and will be described in greater detail below.

Figure 8:
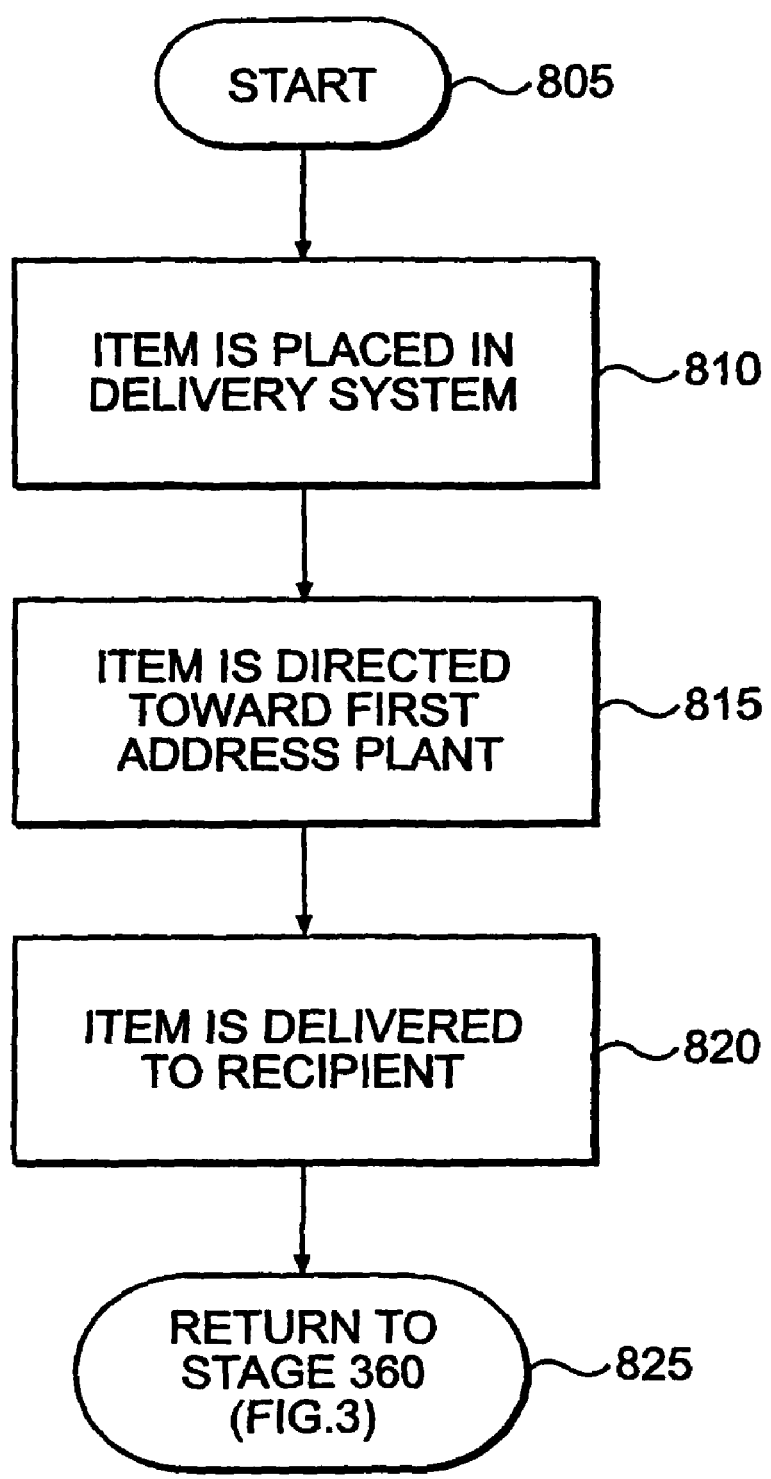
FIG. 8 is a flow chart of an exemplary subroutine used in the exemplary method of FIG. 3 for placing the item in the delivery system directed to the recipient.

From subroutine 340, method 300 advances to subroutine 350 where item 110 is placed in delivery system 230 directed to recipient 255. The stages of subroutine 350 are shown in FIG. 8 and will be described in greater detail below.

Once item 110 is placed in delivery system 230 directed to recipient 255 in subroutine 350, method 300 ends at stage 360.

Item Is Built With Inserter

FIG. 4 describes the subroutine 310 from FIG. 3 in which item 110 is built with inserter 107. An inserter is a commercially available device utilized in the construction of items such as mailpeices. Such devices are well known by those skilled in the art. Subroutine 310 begins at starting block 405 and advances to stage 410 where material is placed in item 110 by inserter 107. For example, user 105 may be a retail company relying upon catalog sales. Item 110 may comprise a mailing containing a catalog, order forms, or other materials to facilitate a retail sale between user 105 and recipient 255.

From stage 410, subroutine 310 advances to stage 415 where label indicating return address 207 is placed on item 110. Return address 207 indicates where user 105 wishes item 110 to returned should it become necessary. Once label indicating return address 207 is placed on item 110 in stage 415, subroutine 310 continues to stage 420 where label indicating first address 250 of recipient 255 is placed on item 110. For example, first address 250 may be the residence of recipient 255.

After label 250 is placed on item 110 in stage 420, subroutine 310 advances to stage 425 where tracking indicia 220 is placed on item 110. As stated previously, tracking indicia 220 may comprise a bar code or a PLANET code.

From stage 425, subroutine 310 advances to stage 430 where delivery payment coding 222 is placed on item 110. Delivery payment coding 222 indicates the payment amount user 105 believes is required by the delivery system operator to deliver item 110 to recipient 255.

Once delivery payment coding 222 is placed on item 110 in stage 430, subroutine 310 continues to stage 435 and returns to subroutine 320 of FIG. 3.

Attributes Of Item Are Obtained

FIG. 5 describes the subroutine 320 from FIG. 3 in which attributes of item 110 are obtained. Subroutine 320 begins at starting block 505 and advances to stage 510 where item 110 is placed in weighing and image capturing system 115. Item 110 passes through weighing and image capturing system 115 to obtain the weight of item 110, to obtain the image of item 110 and to determine the thickness of item 110. In the present embodiment, weighing and image capturing system 115 comprises video camera 120, in-line scale 125, and thickness sensor 130, each connected as a peripheral device to weighing and image capturing server 135. While video camera 120, in-line scale 125, and thickness sensor 130 may be utilized to obtain the image, weight and thickness of item 110 respectively, those skilled in the art will appreciate that may other devices may be utilized to obtain this type of data.

From stage 510, subroutine 320 advances to stage 515 where weight of item 110 is obtained. As stated previously, this may be performed by passing item 110 over an in-line scale 125, however, those skilled in the art will appreciate that the weight of item 110 may be obtained by other systems, methods, or means. Once weight of item 110 is obtained in stage 515, subroutine 320 continues to stage 520 where image of item 110 is obtained. Again, in this embodiment, the image of item 110 may be obtained with video camera 120, however, those skilled in the are will appreciate that there are many other ways to obtain the image of item 110.

After image of item 110 is obtained in stage 520, subroutine 320 advances to stage 525 where thickness of item 110 is obtained with a thickness sensor 130 or other similar device as is know by those skilled in the art. From stage 525 where thickness of item 110 is obtained, subroutine 320 advances to stage 530 where weight, image, and thickness of item 110 are transferred to verification server 145 over network 165. Network 165 may comprise, for example, a local area network (LAN) or a wide area network (WAN). Such networking environments are commonplace in offices, enterprise-wide computer networks, intranets and the Internet and are known by those skilled in the art.

Once weight, image, and thickness of item 110 is transfer to verification server 145 in stage 530, subroutine 320 continues to decision block 535 where it is determined if last item has been processed. For example, referring to the retail sales catalog example, item 110 may be one of a plurality of similar items such as catalogs being processed. If at decision block 535 it is determined that the last item has not been processed, subroutine 320 advances to stage 540 where the next item is placed in weighing and image capturing system 115. After next item is placed in weighing and image capturing system 115, subroutine 320 advances to stage 515 and repeats the aforementioned stages of subroutine 320.

If at decision block 535, however, it was determined that the last item has been processed, subroutine 320 continues to stage 545 and returns to subroutine 330 of FIG. 3.

Correctness Of Attributes Is Verified

FIG. 6A and FIG. 6B describe the subroutine 330 from FIG. 3 in which correctness of attributes is verified. Subroutine 330 begins at starting block 601 and advances to stage 602 where a classification guideline database is received by verification server 145. The classification guideline database contains delivery cost data wherein the cost is based on, for example, the size, weight, thickness, or level of sorting of item 110 as recorded in tacking indicia 220 on item 110. Because verification server 145 contains the classification guideline database and the attribute data (weight, image, and thickness of item 110), the attribute data can be evaluated and the correctness of attributes can be verified. Verification server 145 may receive the classification guideline database from the delivery system operator over by the delivery system operator sending the classification guideline database from the system operator server 155 to the verification server 145 over the communications system 150.

Once the classification guideline database is received in stage 602, subroutine 330 continues to decision block 605 where it is determined if delivery payment coding 222 is correct. This can be determined by reading the payment amount from delivery payment coding 222 as shown in the image and determining if the amount is correct by referencing the classification guideline database in light of the weight, size and thickness of item 110. If at decision block 605 it is determined that delivery payment coding 222 is correct, subroutine 330 advances to stage 620 where an indication is made to a verification file that delivery payment coding 222 is correct. The verification file records the correctness or incorrectness of each attribute checked for item 110 or more items if a plurality of items are checked. If at decision block 605, however, it is determined that delivery payment coding 222 is not correct, subroutine 330 advances to stage 610 where an indication is made to the verification file that deliver payment coding is incorrect. After the indication is made to the verification file that delivery payment coding 222 is incorrect in stage 610, subroutine 330 advances to decision block 615 where it is determined if inserter 107 should be stopped to correct the problem causing delivery payment coding 222 to be incorrect. For example, user 105 may wish to stop inserter 107 and try to make a determination as to why delivery payment coding 222 is incorrect. If at decision block 615 it is determined that inserter 107 should be stopped to correct the problem, subroutine 330 advances to stage 685 where the inserter problem is fixed. If at decision block 615 it is determined, however, that inserter 107 should not be stopped to correct the problem, or from stage 620, subroutine 330 advances to decision block 625 where it is determined if tracking indicia 220 readable.

If at decision block 625 it is determined that tracking indicia 220 is readable, subroutine 330 advances to stage 640 where an indication is made to the verification file that tracking indicia 220 is readable. In determining if tracking indicia 220 is readable, the image data of item 110 is utilized. From this image, tracking indicia 220 is analyzed for readability. If at decision block 625, however, it is determined that tracking indicia 220 not readable, subroutine 330 advances to stage 630 where an indication is made to the verification file that tracking indicia 220 not readable. After an indication is made to the verification file that tracking indicia 220 is not readable in stage 630, subroutine 330 advances to decision block 635 where it is determined if inserter 107 should be stopped to correct the problem causing tracking indicia 220 to not be readable. If at decision block 635 it is determined that inserter 107 should be stopped to correct the problem, subroutine 330 advances to stage 685 (FIG. 6B) where the inserter problem is fixed. If at decision block 635 it is determined, however, that inserter 107 should not be stopped to correct the problem, or from stage 640, subroutine 330 advances to decision block 645 where it is determined if tracking indicia 220 correct.

If at decision block 645 it is determined that tracking indicia 220 is correct, subroutine 330 advances to stage 660 where an indication is made to the verification file that tracking indicia 220 is correct. In determining if tracking indicia 220 is correct, the data contained in the image of item 110 containing tracking indicia 220 is read and compared to other data contained in the image of item 110. If at decision block 645, however, it is determined that tracking indicia 220 not correct, subroutine 330 advances to stage 650 where an indication is made to the verification file that tracking indicia 220 is not correct. After an indication is made to the verification file that tracking indicia 220 is not correct in stage 650, subroutine 330 advances to decision block 655 where it is determined if inserter 107 should be stopped to correct the problem causing tracking indicia 220 to be incorrect. If at decision block 655 it is determined that inserter 107 should be stopped to correct the problem, subroutine 330 advances to stage 685 (FIG. 6B) where the inserter problem is fixed. If at decision block 655 it is determined, however, that inserter 107 should not be stopped to correct the problem, or from stage 660, subroutine 330 advances to decision block 665 (FIG. 6B) where it is determined if sort is correct.

Referring to FIG. 6B, if at decision block 665 it is determined that sort is correct, subroutine 330 advances to stage 680 where an indication is made to the verification file that sort is correct. In determining if sort is correct, the image data of item 110 is utilized. From the image data, tracking indicia 220 is analyzed for sort data contained in tracking indicia 220. If at decision block 665, however, it is determined that sort is not correct, subroutine 330 advances to stage 670 where an indication is made to the verification file that the sort is not correct. After an indication is made to the verification file that the sort is not correct in stage 670, subroutine 330 advances to decision block 375 where it is determined if inserter 107 should be stopped to correct the problem causing the sort to be incorrect. If at decision block 675 it is determined that inserter 107 should be stopped to correct the problem, subroutine 330 advances to stage 685 where the inserter problem is fixed. If at decision block 675 it is determined, however, that inserter 107 should not be stopped to correct the problem, or from stage 680, subroutine 330 advances to decision block 690 where it is determined if last item has been sorted. For example, referring to the retail sales catalog example, item 110 may be one of a plurality of similar items such as catalogs being processed. Thus additional items similar to item 110 may also be processed and subsequently analyzed.

If at decision block 690 it is determined that the last item has not been processed, subroutine 330 advances to stage 695 where the next item is evaluated. After next item is next item evaluated in stage 695, subroutine 330 advances to decision block 605, and repeats the aforementioned stages of subroutine 330 for the next item.

If at decision block 690, however, it was determined that the last item has been processed, subroutine 330 continues to stage 699 and returns to subroutine 340 of FIG. 3.

Indication Of The Correctness Of Attributes Is Transmitted

FIG. 7 describes the subroutine 340 from FIG. 3 in which indication of the correctness of attributes is transmitted to the delivery system operator over communications system 150. Subroutine 340 begins at starting block 705 and advances to stage 710 where master sort data is received in master sort data file 170. Master sort data file 170 contains data as to how user 105 believes item 110 or a plurality of items was processed and sorted by inserter 107 and stacked in staging area 160. Master sort data file 170 containing master sort data may be sent from user server 140 to verification server 145 over network 265.

For example, user 105 may be a catalog retailer in the process of sending items comprising a plurality of catalogs. In an effort to keep the catalog delivery cost down, user 105 may presort the plurality of catalogs and code the level of presorting in tracking indicia 220. Cost savings may be realized due to the fact that the delivery system operator may give discounts based on the level of presorting performed by user 105. In presorting, user 105 may collect all catalogs bound for particular cities and ship the collected catalogs to a representative of the delivery system operator at each respective city. To continue this example, user 105 may sort the plurality of catalogs even further to include bundles of catalogs bound for particular sections of each city. This sorting process may even be carried out to level where the catalogs are sorted in sequence of delivery for predetermined routes of representatives of the delivery system operator in each city. This master sort data can be used for determining the appropriate amount of compensation for user 105 to pay the delivery system operator for delivering item 110 or a plurality of items.

Regardless of the level of sorting, for example, user 105 has a master plan for the sorting process prior to the preparing and subsequent sorting of the items. During the process of preparing and sorting, however, the end product may not reflect exactly the preparing and sorting contemplated by user 105 in the master plan. For example, if the catalogs were sorted to a greater degree than was contemplated by the master plan, then user 105 would owe less for the delivery than would be reflected in the master plan. Likewise, if the catalogs were sorted to a lesser degree than contemplated by the master plan, then user 105 would owe more for delivery than is contemplated by the master plan.

From stage 710 where master sort data is received, subroutine 340 advances to stage 715 where correlation between how item 110 was actually sorted and the master sort data is determined. Because verification server 145 contains the data on how item 110 was actually sorted as reflected in the verification file as constructed in subroutine 330, verification server 145 can now use the data from the verification file to check the accuracy of the master sort data from master sort data file 170. Through this comparison, user's 105 expectation of delivery cost may be adjusted to reflect the actual sort.

Once correlation between how item 110 was actually sorted and master sort data is determined in stage 715, subroutine 340 continues to stage 720 where compliance data and correlation data are stored on verification server 145. After compliance data and correlation data are stored in stage 720, subroutine 340 advances to stage 725 where compliance data and correlation data are encrypted to insure data security during transmission over a public network. The original file, or "plaintext," may be converted into a coded equivalent called "ciphertext" via an encryption algorithm.

From stage 725, subroutine 340 advances to stage 730 where the compliance data and the correlation data are transmitted to the delivery system operator over communications system 150. The ciphertext as coded in stage 725, may be decoded (decrypted) at delivery system operator server 155 and turned back into plaintext. Encryption of the compliance data and the correlation data was discussed in greater detail with respect to FIG. 1.

Once the compliance data and the correlation data are transmitted to delivery system operator over communications system 150 in stage 730, subroutine 340 continues to stage 735 where the compliance data and the correlation data are transmitted to user 105 over communications system 150. Communications system 150 may utilize e-mail, regular mail, facsimile, web pages, or an interactive voice response systems and may be wire line or wireless. Those skilled in the art will appreciate that many other types of communications systems may be used as communications system 150.

After the compliance data and the correlation data are transmitted to user 105 over communications system 150 in stage 735, subroutine 340 advances to stage 740 and returns to subroutine 350 of FIG. 3.

Item Is Placed In Delivery System Directed To Recipient

FIG. 8 describes the subroutine 350 from FIG. 3 in which item 110 is placed in delivery system 230 directed to recipient 255. Subroutine 350 begins at starting block 805 and advances to stage 810 where item 110 is placed in delivery system 230.

From stage 810, subroutine 350 advances to stage 815 where item 110 is directed toward first address plant 240. In directing item 110 to first address 250, item 110 is routed from plant to plant within delivery system 230 wherein item 110 efficiently converge on first address plant 240, which is the plant that serves the delivery address labeled on item 110. Throughout this process, delivery system 230 tracks the progress of item 110 through delivery system 230. FIG. 1 shows user 105 placing item 110 into delivery system 230 at sender plant 225. However, item 110 may be placed in sender plant 225 or any other plant within delivery system 230. Item 110 delivered through delivery system 230 may comprise a letter or any other type mailpiece, however, those skilled in the art will appreciate that many other types of items may be delivery through delivery system 230.

Once item 110 is directed toward first address plant 240 in stage 815, subroutine 350 continues to stage 820 where item 110 is delivered to recipient 255. This is accomplished by transferring item 110 from first address plant 240 to first address 250 by a representative of the delivery system operator or by recipient 255 otherwise obtaining item 110. After item 110 is delivered to recipient 255 in stage 820, subroutine 350 advances to stage 825 and returns to stage 360 of FIG. 3.

In view of the foregoing, it will be appreciated that the present invention provides a system and method for verifying the attributes of an item. Still, it should be understood that the foregoing relates only to the exemplary embodiments of the present invention, and that numerous changes may be made thereto without departing from the spirit and scope of the invention as defined by the following claims.

We claim:

1. A method for verifying attributes of an item to be transported by a delivery system operator, comprising:
   obtaining the attributes of the item prior to supplying the item to the delivery system operator, wherein the attributes comprise one or more of a weight of the item, a thickness of the item, a tracking indicia placed on the item, an address placed on the item, and a delivery payment coding placed on the item;
   verifying correctness of the attributes, wherein the verification comprises:
      determining if the delivery payment coding placed on the item is correct based on a classification guideline database storing an appropriate delivery payment in view of the weight of the item, a size of the item, the thickness of the item, and the tracking indicia placed on the item, and
      determining a readability of a tracking indicia; and
   transmitting an indication of the correctness of the attributes to the delivery system operator over a communications system.

2. The method of claim 1, wherein the obtaining stage further comprises at least one of the following:
   weighing the item, capturing an image of the item, and sensing the thickness of the item.

3. The method of claim 1 further comprising utilizing as the tracking indicia at least one of the following:
   a bar code and a PLANET code.

4. The method of claim 1 further comprising utilizing as the delivery payment coding at least one of the following:
   a bar code, an image indicating an account from which delivery payment has been made, and a postage stamp.

5. The method of claim 1 further comprising processing the item comprising at least one of the following:
   a mailpiece, a United States Postal Service Priority Mail package, and a United States Postal Service Express Mail Package.

6. The method of claim 1, wherein the verifying stage further comprises determining the correctness of a tracking indicia.

7. The method of claim 1, wherein the verifying stage further comprises determining if the item was sorted correctly.

8. The method of claim 1, wherein the transmitting stage further comprises encrypting the indication of the correctness of the attributes before transmitting it to the delivery system operator.

9. The method of claim 1 further comprising:
   receiving master sort data;
   determining a correlation between how the item was sorted and the master sort data; and
   transmitting the correlation between how the item was sorted and the master sort data to the delivery system operator over the communications system.

10. The method of claim 9 further comprising determining if additional payment is due based on the correlation between how the item was sorted and the master sort data.

11. The method of claim 9, wherein the transmitting stage further comprises encrypting the correlation between how the item was sorted and the master sort data before transmitting it to the delivery system operator.

12. The method of claim 9 further comprising transmitting the correlation between how the item was sorted and the master sort data to a user over the communications system.

13. The method of claim 9 further comprising encrypting the correlation between how the item was sorted and the master sort data before transmitting it to the user over the communications system.

14. The method of claim 1 further comprising transmitting the indication of the correctness of the attributes to a user over the communications system.

15. The method of claim 14 further comprising encrypting the indication of the correctness of the attributes before transmitting it to the user.

16. The method of claim 1 further comprising utilizing in the communications system at least one of the following:
   regular mail, e-mail, facsimile, internet, and an interactive voice response system.

17. The method of claim 1 further comprising preparing the item with an inserter.

18. The method of claim 1 further comprising placing the item in the delivery system directed to a recipient.

19. A system for verifying attributes of an item to be transported by a delivery system operator, comprising:
   a component for obtaining the attributes of the item prior to supplying the item to the delivery system operator, wherein the attributes comprise one or more of a weight of the item, a thickness of the item, a tracking indicia placed on the item, an address placed on the item, and a delivery payment coding placed on the item;
   a component for verifying correctness of the attributes, wherein the verification comprises:
      determining if the delivery payment coding placed on the item is correct based on a classification guideline database storing an appropriate delivery payment in view of the weight of the item, a size of the item, the thickness of the item, and the tracking indicia placed on the item, and
      determining a readability of a tracking indicia; and
   a component for transmitting an indication of the correctness of the attributes to the delivery system operator over a communications system.

20. The system of claim 19, wherein the component for obtaining further comprises at least one of the following:
   a component for weighing the item, a component for capturing an image of the item, and a component for sensing the thickness of the item.

21. The system of claim 19, wherein the tracking indicia comprises at least one of the following:
   a bar code and a PLANET code.

22. The system of claim 19, wherein the delivery payment coding comprises at least one of the following:
   a bar code, an image indicating an account from which delivery payment has been made, and a postage stamp.

23. The system of claim 19, wherein the item comprises at least one of the following:
   a mailpiece, a United States Postal Service Priority Mail package, and a United States Postal Service Express Mail Package.

24. The system of claim 19, wherein the component for verifying further comprises a component for determining the correctness of a tracking indicia.

25. The system of claim 19, wherein the component for verifying further comprises a component for determining if the item was sorted correctly.

26. The system of claim 19, wherein the component for transmitting further comprises a component for encrypting the indication of the correctness of the attributes before transmitting it to the delivery system operator.

27. The system of claim 19 further comprising:
a component for receiving master sort data;
a component for determining a correlation between how the item was sorted and the master sort data; and
a component for transmitting the correlation between how the item was sorted and the master sort data to the delivery system operator over the communications system.

28. The system of claim 27 further comprising a component for determining if additional payment is due based on the correlation between how the item was sorted and the master sort data.

29. The system of claim 27, wherein the component for transmitting further comprises a component for encrypting the correlation between how the item was sorted and the master sort data before sending it to the delivery system operator.

30. The system of claim 27 further comprising a component for transmitting the correlation between how the item was sorted and the master sort data to a user over the communications system.

31. The system of claim 27 further comprising a component for encrypting the correlation between how the item was sorted and the master sort data before sending it to the user over the communications system.

32. The system of claim 19 further comprising a component for transmitting the indication of the correctness of the attributes to a user over the communications system.

33. The system of claim 32 further comprising a component for encrypting the indication of the correctness of the attributes before transmitting it to the user.

34. The system of claim 19 further comprising a component for utilizing in the communications system at least one of the following:
regular mail, e-mail, facsimile, internet, and an interactive voice response system.

35. The system of claim 19 further comprising a component for preparing the item with an inserter.

36. The system of claim 19 further comprising a component for placing the item in the delivery system directed to a recipient.

37. A method for verifying attributes of an item, comprising:
preparing the item with an inserter;
obtaining the attributes of the item prior to placing the item in a delivery system by at least one of weighing the item, capturing an image of the item, and sensing the thickness of the item, the attributes comprising at least one of a weight of the item, a thickness of the item, a tracking indicia placed on the item, an address placed on the item, and a delivery payment coding placed on the item;
the tracking indicia comprising at least one of the following:
a bar code and a PLANET code, and the delivery payment coding comprising at least one of the following:
a bar code, an image indicating an account from which delivery payment has been made, and a postage stamp;
verifying correctness of the attributes, comprising:
determining if the delivery payment coding placed on the item is correct by utilizing a classification guideline database indicating an appropriate delivery payment in view of the weight of the item, the size of the item, the thickness of the item, and the tracking indicia,
determining a readability of the tracking indicia,
determining the correctness of the tracking indicia, and
determining if the item was sorted correctly;
encrypting an indication of the correctness of the attributes;
transmitting the indication of the correctness of the attributes to a delivery system operator and a user over a communications system, the communications system comprising at least one of the following:
regular mail, e-mail, facsimile, internet, and an interactive voice response system;
receiving master sort data;
determining a correlation between how the item was sorted and the master sort data;
encrypting the correlation between how the item was sorted and the master sort data;
transmitting the correlation between how the item was sorted and the master sort data to the delivery system operator and the user over the communications system;
determining if additional payment is due based on the correlation between how the item was sorted and the master sort data; and
placing the item in the delivery system directed to a recipient.

* * * * *